(No Model.)

T. H. CHUBB.
Float and Sinker for Fishing Line.

No. 235,510. Patented Dec. 14, 1880.

Witnesses.
Thos. A. Blair
H. E. Lodge

Inventor.
Thomas H. Chubb.
F. Curtis, Atty.

UNITED STATES PATENT OFFICE.

THOMAS H. CHUBB, OF POST MILLS, VERMONT.

FLOAT AND SINKER FOR FISHING-LINES.

SPECIFICATION forming part of Letters Patent No. 235,510, dated December 14, 1880.

Application filed June 10, 1880. (No model.)

*To all whom it may concern:*

Be it known that I, THOMAS H. CHUBB, a citizen of the United States, residing at Post Mills, in the county of Orange and State of Vermont, have invented certain useful Improvements in Floats and Sinkers for Fishing-Lines; and I do hereby declare the following to be a full, clear, and exact description of the invention, such as will enable others skilled in the art to which it appertains to make and use the same.

My present invention relates to means for enabling floats or sinkers to be readily applied to or changed in a position upon a fish-line; and it consists in the attachment to one end of a float or sinker of a wire secured at one end to the float or sinker and terminating in a hook, while alongside this hooked wire is disposed a straight wire or prong, also secured at one end to the end of the float or sinker, the fish-line being first wound several times about the prong and the coils pushed up into the bow or bend of the hook, one end or portion of the line extending out through such bend, while the other portion passes alongside the body of the float or sinker and through an eye in its opposite end, the whole being so arranged that the weight of the line and the tension upon it tends to draw the prong before named tightly up against the side of the hook and prevent escape from the head of the latter of the coils of line about such prong in one direction, while the passage between the prong and the throat of the hook is sufficiently narrow to prevent escape of the coils at this point.

Figure 1:
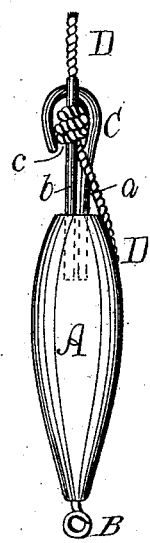
Figure 2:
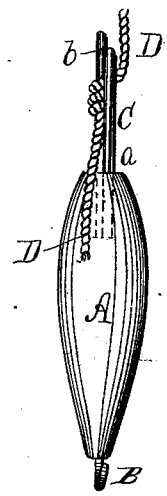
Figure 3:
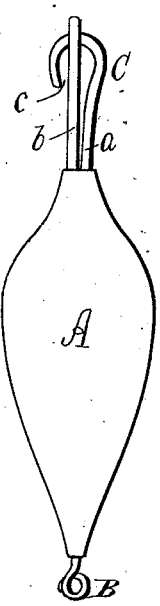

The drawings accompanying this specification represent, in Figure 1, a side, and in Fig. 2 an edge, view of a sinker containing my invention, while Fig. 3 is a view of a "float" likewise provided.

In these drawings, A represents the body of a float or sinker such as is extensively used with fishing-lines, the lower end of such body being provided with an eye or hook, B, in the usual manner.

In carrying my improvement into practice I provide a short piece of metallic wire of the proper size and length and fashion one end of the same into a hook, C, while the end of the straight portion or shank $a$ of the hook I insert in an axial hole in the upper end of the body A, so that the shank stands in alignment with the axis of the said body. I next provide a straight wire, $b$, of practically the same gage as the first, and I insert one end of this wire in the same hole that contains the end of the hook, or in a hole immediately adjacent to the latter, and I solder both securely in place.

The wire or prong $b$ is arranged to stand alongside the hook, and so as to extend somewhat beyond the outer end of the latter, the passage between the prong and the throat $c$ of the hook being attenuated in order that after the line D has been coiled several times about the prong and pushed up into the eye of the hook the elasticity of the prong shall prevent escape of the coils from such eye.

In applying the float or sinker, hold the same in the left hand, with the eye to the left and with the prong nearest the user, and pass the outer end of the line through the eye B, and after pulling the requisite amount of line through the eye, take several turns with it about the prong $b$, passing the line outward under the prong in beginning, and pass the slack of the line about the point of the hook, and upward through its throat, and into its eye between such throat and the prong, and then push the coils of line also into the eye, and pull the line taut, the elasticity of the prong allowing it to yield sufficiently to permit of passage of the line into the eye, and adapting it to prevent escape of the line from the eye.

The draft upon the line tends to pull the prong against the side of the bend of the hook; hence the coils of line cannot escape from the end of the prong, while the friction upon the line is so great, owing to its being wound about the prong and its abrupt bend in passing out of the eye of the hook, that no ordinary draft upon it will pull it through such eye.

It is not essential that the float or sinker should be provided with the eye B at its lower end, and in many instances it is omitted. My invention is equally applicable whether the eye be employed or omitted.

It will be seen from the foregoing that by the use of my improvement the position of the float or sinker upon the line may be changed readily and expeditiously, and that the device is neat and durable.

I remark, in conclusion, that I do not claim a float or sinker provided with a ring and prong. I am aware that such a device has before been proposed.

I claim—

The hook and prong, in combination with the body of the float or sinker, and operating to confine the line, substantially as explained and set forth.

In testimony whereof I affix my signature in presence of two witnesses.

THO. H. CHUBB.

Witnesses:
WM. B. CHUBB,
A. J. ELLIOTT.